VOLTAGE VARIABLE CAPACITIVE NETWORK

Filed March 7, 1966

INVENTORS.
DAVID R. LUDWIG
LESTER R. BRODEUR
BY
Walter J. Kreske
ATTORNEY

INVENTORS.
DAVID R. LUDWIG
LESTER R. BRODEUR
BY
Walter J. Kreske
ATTORNEY

INVENTORS.
DAVID R. LUDWIG
LESTER R. BRODEUR
BY
Walter J. Kreske
ATTORNEY

United States Patent Office 3,443,205
Patented May 6, 1969

3,443,205
VOLTAGE VARIABLE CAPACITIVE NETWORK
David R. Ludwig, Braintree, Mass., and Lester R. Brodeur, Nashua, N.H., assignors, by mesne assignments to Walter J. Kreske, Newton Center, Mass.
Filed Mar. 7, 1966, Ser. No. 532,457
Int. Cl. H02m 3/04, 5/06
U.S. Cl. 323—74 9 Claims

ABSTRACT OF THE DISCLOSURE

A circuit network of a plurality of voltage variable capacitor elements coupled in series and arranged for bias voltage sources to be coupled across the respective elements in manner to selectively forward and reverse bias respective elements in the series to effect a selectable wider range of useful capacitive values than possible in simple series and parallel couplings of such elements.

This invention relates to voltage variable capacitor circuits and more particularly to a voltage variable capacitor network of the type having a plurality of series coupled voltage variable capacitor elements with each element having a reverse bias voltage variable capacitor characteristic and a forward bias conduction characteristic and with a voltage biasing structure across each of the elements for selectively biasing each of the elements in manner to remove or add the capacitance of the element with respect to the overall capacitance of the network.

The customary practice in voltage variable capacitor circuits has been to use a single voltage variable capacitor element or a simple series or parallel combination of such voltage variable capacitor elements for achieving variation in capacitance with change in control voltage across the circuit. However, such conventional circuit arrangements are severly limited in the range of capacitive variations which may be obtained thereby and are thus unsuitable for many applications requiring a broader range of obtainable capacitive values, for example, such as required for broad range tuning in radio frequency circuits. Also, such conventional arrangements have the undesirable characteristic of being non-linear in capacitive variation with respect to control voltage over most of their useful operating ranges.

These problems have been overcome by the present invention which, besides providing a vastly increased range of capacitive values and increased range of linear capacitive response to change in control voltage, also incorporates other desirable features and advantages. Among these other desirable features and advantages are included that of achieving the increased range of linear capacitive values within substantially the same range of control voltages heretofore used, thereby providing a desirable increased capacitive output sensitivity to control voltage changes. Also, the present invention lends itself to desirably compact, reliable, rugged circuit structure with a long trouble free operating life and particularly to its adaptibility to compact integrated circuit construction.

A primary object of the present invention is the provision of a voltage variable capacitor network which has a very wide range of capacitance change capability with respect to change in control voltage.

Another object is the provision of a voltage variable capacitor network which has linear capacitive response capability over the major portion of its operating range.

A further object is the provision of a voltage variable capacitor network which has capacity for substantially unlimited modular additions thereto for increasing operating range of capacitive values.

And still further objects include a voltage variable capacitor network which lends itself to highly compact and rugged construction, particularly compact integrated circuit construction, reliable and long lived operation.

These objects, features and advantages are achieved generally by the provision of a plurality of series coupled voltage variable capacitors arranged with voltage biasing structures across each of said capacitors with capability for removing the capacitive characteristics of selected ones of the voltage variable capacitors to produce a selected overall network capacitance.

By providing a primary voltage control across a portion of said series coupled voltage variable capacitors representing maximum available overall capacity and a plurality of secondary voltage controls or offsets across successive portions of said series coupled voltage variable capacitor for progressively adding or subtracting the capacitance of said respective portions, a relatively simple arrangement for achieving a wide range in overall network capacities is thereby achieved.

By making the primary voltage control in the form of a variable voltage source over the range encompassing the voltage offsets, capacitance variation over the entire range of the series coupled variable capacitors in response to variation of primary control voltage is thereby achieved.

By making the secondary or offset voltage sources as fixed voltage offsets at values such that the non-linear characteristic of the associated voltage variable capacitors compliment each other to thereby provide a resultant linear capacitance characteristic, smooth linear overall capacity control with respect to the primary voltage control is thereby achieved over the operating range of the network.

By providing with respect to the paths of the voltage offset sources, a relatively low direct current impedance path from the primary control voltage source to the point of application on the voltage variable capacitor string, voltage influence by said offsets on the primary point of application is thereby minimized.

By providing with respect to the capacitive values of the individual voltage variable capacitors in the network, a relatively large fixed capacitor at the end of the series coupled voltage variable capacitor string farthest from the point of primary voltage control, grounding of the nearest adjacent effective secondary voltage source is prevented and radio frequency influence by said fixed capacitor on radio frequency signals in the network is minimized. It also permits selective forward biasing on the voltage variable capacitor immediately adjacent to the fixed capacitor.

By providing a plurality of parallel coupled voltage variable capacitors in place of selected single capacitors in the series string, substantially unlimited range of overall capacitive values with respect to control voltage is thereby achieved.

These and other features, objects and advantages will be better understood from the following description taken in connection with the accompanying drawings of preferred embodiments of the invention and wherein.

Figure 1:
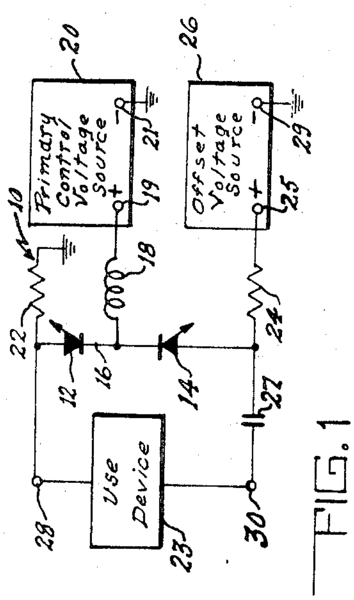
FIG. 1 is a partially schematic and partially block diagram of a voltage variable capacitor network in accordance with the present invention utilizing two voltage variable capacitors arranged for operation with positive biasing.

Referring to FIG. 1 in more detail, a voltage variable capacitor network in accordance with the present invention is designated generally by the numeral 10. The voltage variable capacitor network 10 has a pair of back-to-back coupled voltage variable capacitor diodes 12 and 14, preferably being varactors. The term varactor as used herein is defined as a semi-conductor junction whose junction capacity is voltage dependent while the junction is reverse biased and which is optimised for low losses at high frequencies. However, it should be understood here that the present invention also contemplates the use of any diode which has a voltage variable capacitive junction characteristic under reverse bias, such as silicon diodes, germanium diodes, switching diodes and Zener diodes. By back-to-back as used herein is meant that electrodes of the same polarity, which in the present instance are the cathodes of the respective varactors 12 and 14, are coupled together, such as by an electric line 16.

In FIG. 1 the electric line 16 is also coupled through a low resistance element 18, such as an inductance coil, to positive terminal 19 of a variable primary direct current voltage biasing source or control 20, the negative terminal 21 of which is coupled to ground. The anode of the varactor 12 is coupled through a resistance 22 to ground and to one side of a circuit or use device 23, such as a tunable radio frequency circuit, with which the voltage variable capacitor network 10 is to be used. The resistance 22 is selected with a high resistance value with respect to the resistance value of the inductor 18.

The other side of the circuit 23 is coupled through a decoupling capacitor 27 to the anode of the varactor 14. The decoupling capacitor 27 is selected with a large capacitance value with respect to the capacitances of the varactors 12 and 14. The anode of the varactor 14 is also coupled through a current limiting resistor 24 to the positive terminal 25 of an offset direct current voltage control or source 26, whose negative terminal 29 is coupled to ground, for offsetting the voltage across the varactor 14 with respect to the primary voltage bias control 20. The current limiting resistor 24 is selected with a resistance value which is high with respect to the resistance value of the inductor 18.

Figure 7:
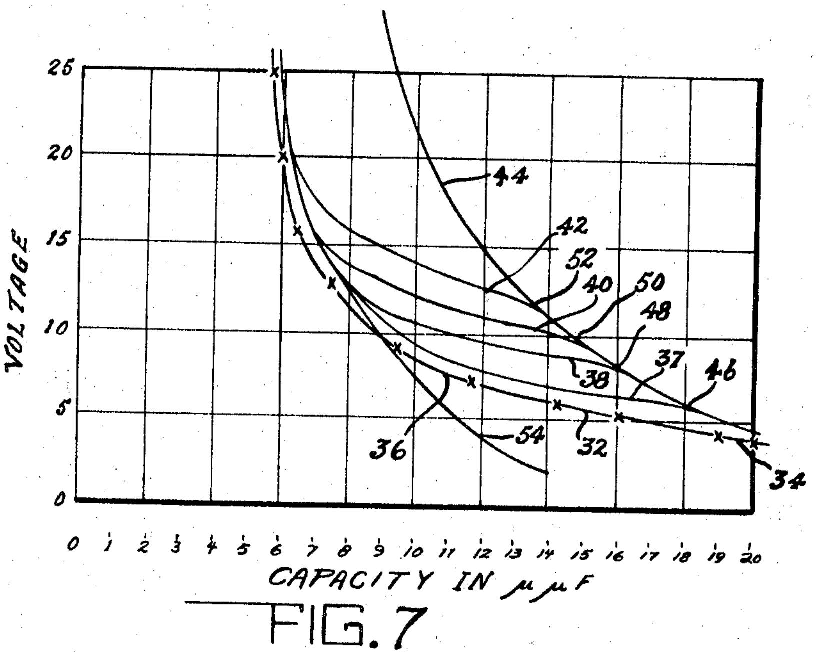
FIG. 7 is a graph to more clearly illustrate operation of the FIG. 1 embodiment.

In the operation of the voltage variable capacitor network 10, if for purposes of illustration and not limitation, the varactors 12 and 14 selected are of a value commercially known as PC136 varactors, and the bias voltage source 20 is selected with a range of zero to twenty-five volts and the offset bias voltage source 26 is selected with a fixed value of six volts, the values of the capacitance across the terminals 28 and 30 to the use circuit 23 may be varied by varying the bias voltage of the primary control voltage source 20 in accordance with the curve 32 in FIG. 7.

In FIG. 7 it may be seen that for primary control bias voltages of approximately 3.5 volts at point 34 on the curve 32 to 7 volts at point 36 on the curve 32, a highly linear response in capacitive values across the network 10 appear with respect to control voltage. Curve 32 was plotted from actual measured values in the circuit 10.

Other response characteristics may be obtained by changing the fixed offset voltage at the offset voltage source 26. Such changed network response characteristics appear in curves 37, 38, 40 and 42 in FIG. 7. For example curve 38 illustrates the characteristic achieved with an offset voltage at circuit 26 of 8 volts. The curve 40 illustrates the characteristic obtained with an offset of 10 volts. The curve 42 illustrates the characteristic obtained with an offset of 12 volts and curve 37 by an offset of 6 volts. Inspection of the curves in FIG. 7 show that in each instance a substantial linearity over a wide operating range is obtained. Also, the linear characteristic appears with a low angle of incidence with respect to the capacitance scale, thereby providing a desirably high order of response sensitivity to variations in control voltage.

Curves 37, 38, 40 and 42, each follow a single varactor characteristic curve 44 up to points 46, 48, 50 and 52 respectively which mark the points where the other varactor 14 ceases to be conductive and displays its maximum capacitive value. It has been found that the relatively high capacitive value of the varactor 14 with respect to varactor 12 at the points 46, 48, 50 and 52 results in each instance in a relatively smooth transition from the single varactor curve 44.

As the primary control voltage from source 20 continues to increase, the capacitance value between terminals 28 and 30 across the varactors 12 and 14 will progressively decrease, as shown by the respective curves 37, 38, 40 and 42 which ultimately merge into the upper portion of a simple series varactor characteristic curve 54 for two simple series PC136 varactors.

Reference to FIG. 7 shows that the smoothest transition and the most linear capacitive characteristic is achieved by selecting an offset voltage of 6 volts characterized by the curve 37 which was derived by theoretically computed values. The degree of linearity is even greater in the curve 32 which was obtained by actual measurements with a capacity meter for the FIG. 1 embodiment using an offset voltage of 6 volts and other component values mentioned above.

Thus it is seen that all of the curves 32, 37, 38, 40 and 42 relating to the FIG. 1 embodiment exhibit a much wider range of selectable linear capacitance values than those obtainable with a single varactor which will have a characteristic such as illustrated by the curve 44 or a simple series varactor circuit such as illustrated by the curve 54. Also, by using a selection of components and offset bias voltages for achieving the greatest linear voltage capability such as illustrated by the curves 32 and 37 is simplified.

Figure 2:
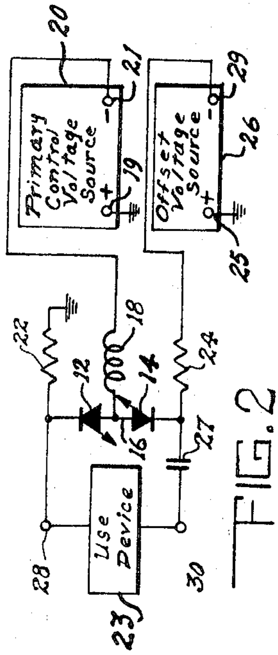
FIG. 2 is a partially schematic and partially block diagram of a voltage variable capacitor network in accordance with the present invention similar to that of FIG. 1 except in that it is arranged for operation with negative biasing.

While the FIG. 1 embodiment is arranged for positive biasing voltages, the invention is also adaptable for operation with negative biasing voltages. Such a negative biasing arrangement is illustrated in FIG. 2. The FIG. 2 illustration carries the same components as that of the FIG. 1 embodiment and are identified by like numerals. The difference between the FIG. 1 and FIG. 2 illustrative embodiments lies in the connections between the elements. Whereas in FIG. 1 the back-to-back varactors 12 and 14 have their cathodes coupled together by electric line 16, in FIG. 2 the back-to-back varactors 12 and 14 have their anodes coupled together by electric line 16. Also, in FIG. 2, electric line 16 is coupled through inductance 18 to the negative terminal 21 of the primary voltage biasing control 20 and the positive terminal 19 is coupled to ground. Additionally in FIG. 2 the cathode of the second varactor 14 is coupled to the capacitor 27 and through resistor 24 to the negative terminal 29 of the offset voltage source 26 whose positive terminal 25 is coupled to ground.

The operation of the FIG. 2 embodiment will be the same as that explained above with respect to the FIG. 1 embodiment except in that negative instead of positive bias control voltages are used. The FIG. 7 graph is applicable to the FIG. 2 embodiment provided that the ordinate biasing voltages are listed as negative biasing voltages.

Figures 3, 4, 5:
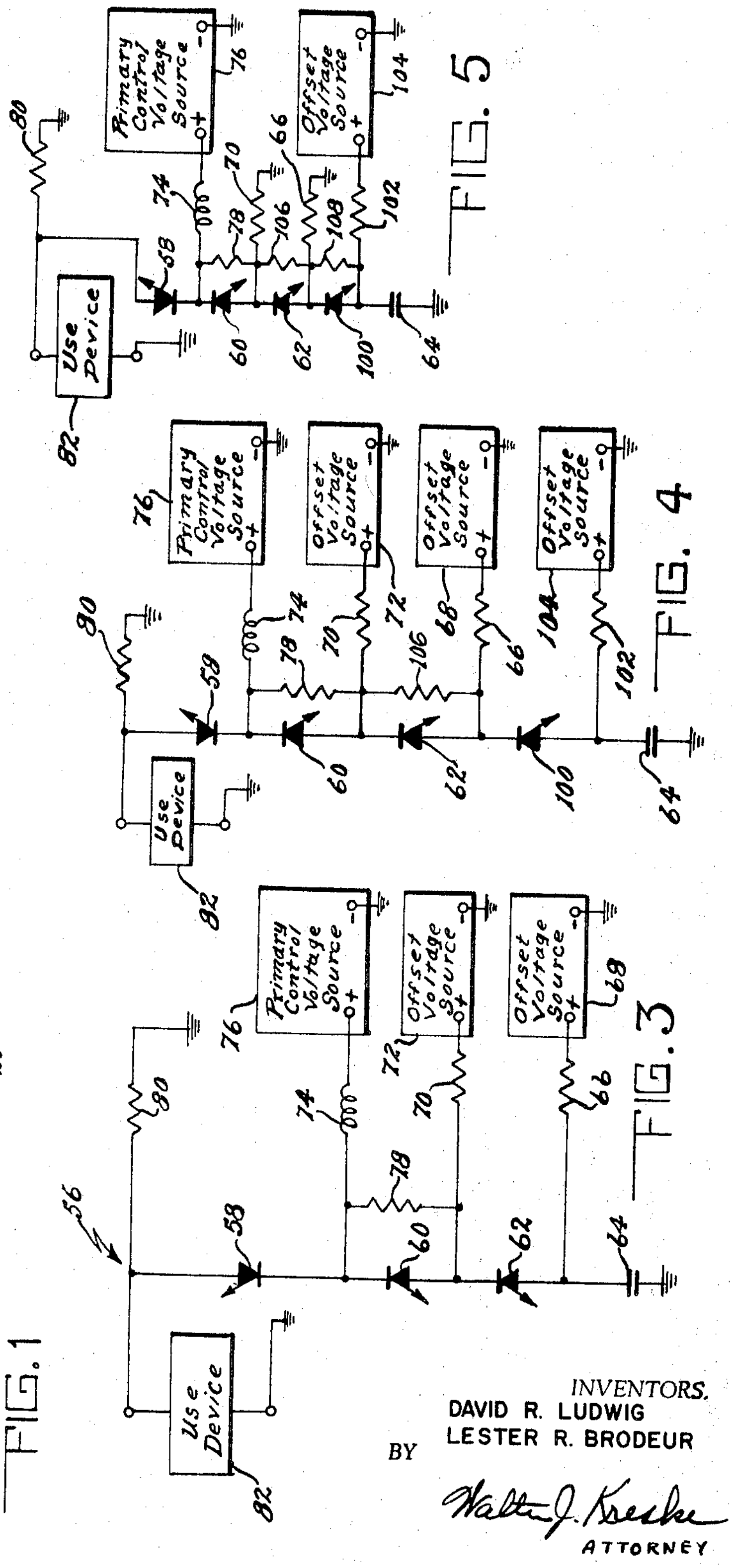
FIG. 3 is a partially schematic and partially block diagram illustrating a voltage variable capacitor arrangement in accordance with the present invention using three voltage variable capacitors.
FIG. 4 is a partially schematic and partially block diagram of voltage variable capacitor network in accordance with the present invention using four voltage variable capacitors.
FIG. 5 is a partially schematic and partially block diagram of a voltage variable capacitor network in accordance with the present invention illustrating the use of a single offset voltage source for a plurality of series coupled voltage variable capacitors.

Referring to FIG. 3 in more detail, a voltage variable capacitor network utilizing three series coupled voltage variable capacitors in accordance with the present invention is designated generally by the numeral 56. The voltage variable capacitor network 56 has three varactors 58, 60 and 62 coupled in series, the varactors 58 and 60 being back-to-back with their cathodes coupled together for positive biasing as explained above with respect to the FIG. 1 embodiment. The third varactor 62 has its cathode coupled to the anode of the varactor 60 and its anode coupled through a decoupling capacitor 64 to ground and through a current limiting resistor 66 to the positive terminal of an offset voltage source 68, the negative terminal of which is coupled to ground. The anode of varactor 60 and the cathode of varactor 62 are coupled through current limiting resistor 70 to the positive terminal of another offset voltage source 72, the negative terminal of which is coupled to ground. The cathodes of the back-to-back varactors 58 and 60 are coupled through a low resistance element such as a radio frequency choke 74 to the positive terminal of a primary control voltage source 76, the negative terminal of which is coupled to ground.

A by-pass resistor 78 is coupled across the varactor 60 for providing a current path for the varactor 62 when the varactor 60 is non-conductive as will be hereinafter further described.

The anode of the varactor 58 is coupled through a resistor 80 to ground and to one side of a use device 82, such as a variable capacitance tunable circuit, the other side of which is coupled to ground.

If by way of illustrative example and not limitation, the varactors 58, 60 and 62 are of a type known commercially as PC137, PC136 and PC138 respectively and other components in the network 56 have values as follows:

| | | |
|---|---|---|
| Resistor **80** | ohms | 20,000 |
| **66** | do | 1,000 |
| **70** | do | 2,000 |
| **78** | do | 1,000 |
| Capacitor **64** | picofarads | 1,000 |
| Offset voltage source **68** | | [1]+2 |
| Offset voltage source **72** | | [2]0 |

[1] Volts fixed.
[2] Volts fixed with respect to offset voltage source 68.

Figure 8:
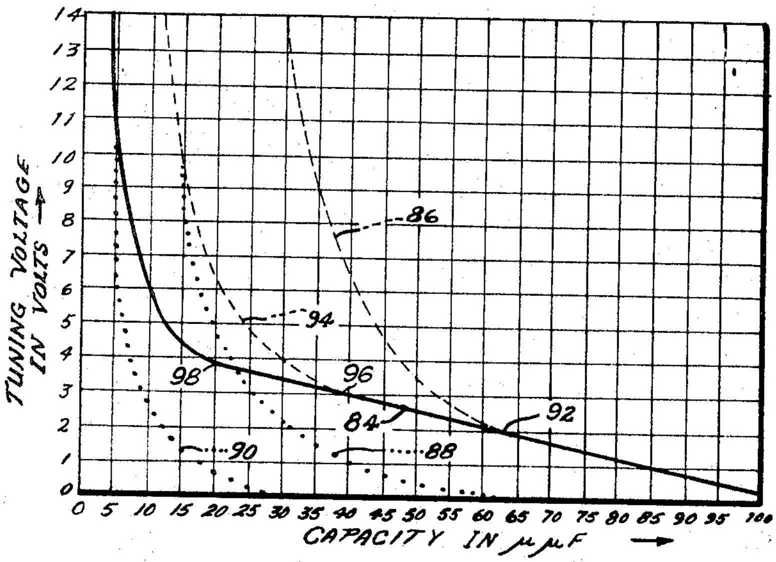
FIG. 8 is a graph to more clearly illustrate operation of the FIG. 3 embodiment.

The capacitance output characteristic of the voltage variable capacitor network 56 across the use device 82 with change in primary control voltage of the primary voltage source 76 will appear as curve 84 in FIG. 8.

In FIG. 8, the broken line curve 86 represents the change in capacitance with change in bias voltage of the PC137 varactor 58 when appearing in a circuit by itself. The dotted line curve 88 represents the change in capacitance with respect to bias voltage characteristic of the PC137 varactor 58 and PC136 varactor 60 when appearing in a simple series circuit. And dotted line curve 90 represents the change in capacitance with respect to change in bias voltage characteristic of the PC137, PC136 and PC138 varactors 58, 60 and 62 when appearing in a simple series circuit.

When the primary control voltage from the voltage source 76 is below approximately 2 volts, only varactor 58 will be back biased and therefor non-conductive, whereas varactor 62 will be forward biased because of the 2 volt offset from offset voltage source 68 and therefor conductive. Forward conduction in varactor 62 causes conduction in the by-pass resistor 78 in the direction of the primary voltage source 76 and thereby effects a forward bias on the varactor 60 causing it to be conductive also. Thus with forward conduction in the varactors 60 and 62, and with the capacitor 64 having a relatively high capacitive value with respect to the varactors, the capacitance characteristic of the network 56 will be substantially that of the varactor 58. This capacitive characteristic for primary voltages under 2 volts appears as the solid line portion at the lower end of the curve 86 which is also the lower end of curve 84 in FIG. 8.

As the primary voltage from the voltage source 76 increases above 2 volts, the voltage across the by-pass resistor 78 is rversed, placing a reverse bias on the varactor 60 which thereby becomes non-conductive. With varactors 58 and 60 being non-conductive, the capacitance characteristic of the voltage variable capacitor network 56 with increasing voltage digresses from curve 86 at point 92 which is approximately the 2 volt point (FIG. 8) and follows the substantially linear portion of curve 84 which is also the bottom portion of curve 94. Curve 94 is asymptotic to curve 88 and illustrates the resultant capacity curve using only the varactors 58 and 60.

However, the illustrative circuit configuration 56 is such that when the primary control voltage from the voltage source 76 exceeds 3 volts, point 96 on curves 94 and 84, the varactor 62 becomes non-conductive along with varactors 60 and 58. Thereby at point 96 the capacitive characteristic 84 digresses from the two capacitor curves 94 to provide a further useful linear extension to approximately point 98 before it finally turns upward to eventually become asymptotic with the third varactor curve 90. Thus, in this illustrative embodiment, a highly linear reresponse characteristic has been achieved over the range of 19 to 100 picofarads capacitance shown in FIG. 8. As shown in FIG. 8, this is a much wider linear range of capacitive values than that obtainable by a single varactor alone, or even two varactors. The addition of each varactor in accordance with the present invention may be made to advantageously extend the useful capacitance range of the network.

For example, an extension to four series coupled varactors in accordance with the present invention is shown in FIG. 4 which may be structurally the same as the embodiment of FIG. 3, carrying like numerals for like parts, except in that a fourth varactor 100 is interposed between the decoupling capacitor 64 and the varactor 62 with its cathode coupled to the anode of varactor 62 and its anode coupled through the decoupling capacitor 64 to ground and through an additional current limiting resistor 102 to the positive terminal of an additional offset voltage source 104, the negative terminal of which is coupled to ground. Also, an additional bypass resistor 106 is coupled across the varactor 62 for conducting current when varactor 62 is non-conductive and varactor 100 is conductive as explained above with respect to by-pass resistor 78.

In the operation of the FIG. 4 embodiment, the offset voltages of offset voltage sources 72, 68 and 104 are preferably selected with values such that when the voltage of the primary biasing source 76 rises, as explained in connection with FIG. 3, the varactors 60, 62 and 100 respectively become sequentially non-conductive so as to sequentially add the capacitance of the corresponding varactor to the overall capacitance of the voltage variable capacitor network.

While the embodiment of FIG. 4 is shown with separate offset voltage sources 72, 68 and 104 for the varactors 60, 62 and 100 respectively to provide maximum versatility for adjustment and variation in control of the network 56, this number and more varactors may be accommodated for sequential conduction and non-conduction by a single offset voltage source as shown in the FIG. 5 embodiment. While the FIG. 5 illustrative embodiment is arranged for a four varactor series arrangement in accordance with the present invention, the same principle of operation is applicable to substantially any number of varactors in such series coupling. The structure in FIG. 5 may be the same as that in FIG. 4, with like components being identified by like numerals, except in that in place of offset voltage sources 72 and 68, the resistors 70 and 66 may be coupled to ground, leaving only one offset voltage source 104. Also, a by-pass resistor 108 is coupled across the varactor 100.

In the operation of the FIG. 5 embodiment, the values of resistors 66, 70, 78, 102, 106 and 108 and offset voltage from source 104 are preferably proportioned so that when the voltage from primary source 76 rises to specified points the varactors 60, 62 and 100 respectively will successively cease to be conductive and in inverse order again become conductive as the voltage from the primary source again decreases. The achievable result will be substantially that described in connection with FIG. 4 above, again making possible a very wide variation in usable capacitive values over that possible in conventional varactor circuits.

Figure 6:
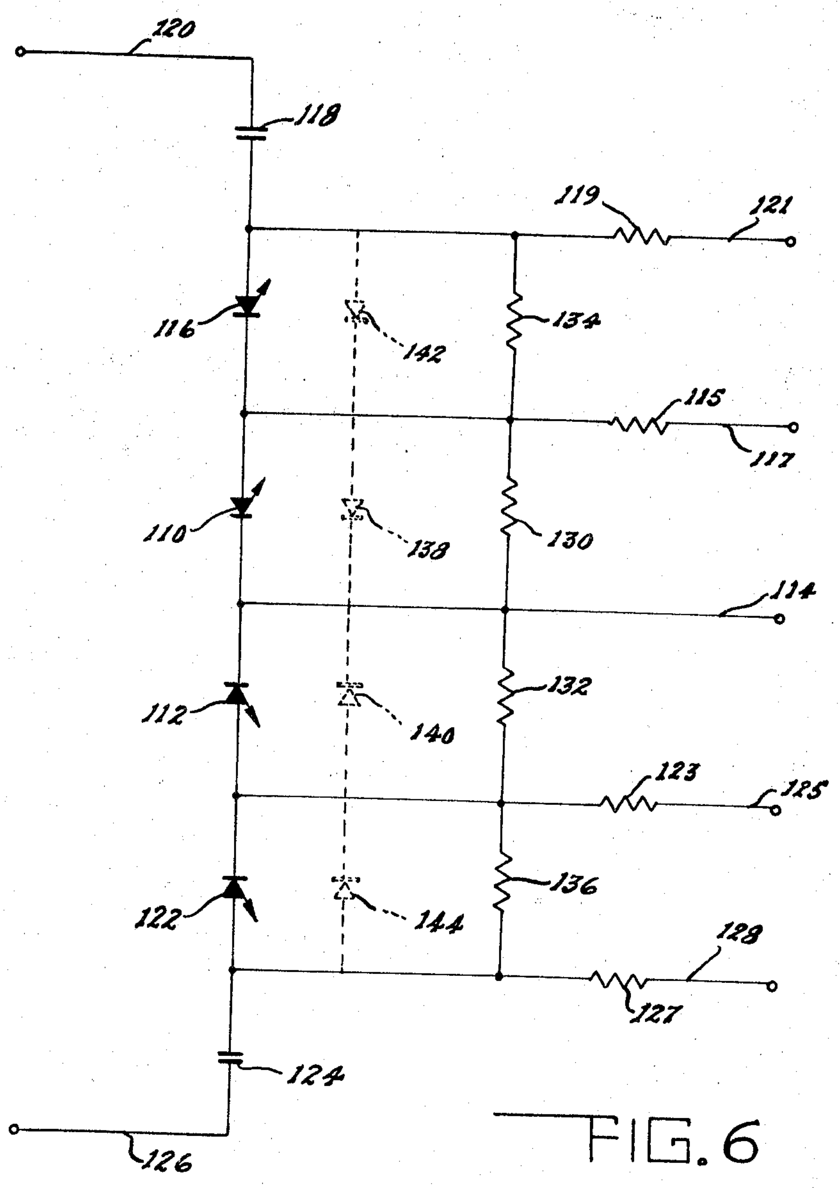
FIG. 6 is a schematic diagram illustrating an alternative embodiment of the present invention.

The present invention is also applicable for extending series groupings in both directions from the back-to-back varactors as shown in FIG. 6 which is a schematic illustration of a four varactor series arrangement with a varactor added on each side of the back-to-back varactors. The FIG. 6 illustration may be considered a generalized application of the present invention. In FIG. 6, back-to-back varactors 110 and 112 have their cathodes coupled to a primary control voltage source lead 114. Varactor 110 has its anode coupled to the cathode of a varactor 116 and through a current limiting resistor 115 to a voltage offset lead 117. The anode of varactor 116 is coupled through a capacitor 118 to a network output lead 120 and through a current limiting resistor 119 to voltage offset lead 121. The other back-to-back varactor 112 has its anode coupled to the cathode of a varactor 122 and through a current limiting resistor 123 to a voltage offset lead 125. The anode of varactor 122 is coupled through a capacitor 124 to a network output lead 126 and through a current limiting resistor 127 to a voltage offset lead 128. By-pass resistors 130, 132, 134 and 136 are coupled across varactors 110, 112, 116 and 122 respectively.

The capacitors 118 and 124 may have equal capacitive values which are preferably large with respect to the capacitive values of the varactors.

The FIG. 6 embodiment is very versatile in its operating capabilities in that the varactors may be selectively programmed for conduction and non-conduction as desired by proper control of the voltages on the input leads for thereby achieving across output leads 120 and 126 the characteristic wide range of capacitance values explained above in connection with FIGS. 4 and 5.

The voltage variable network in FIG. 6 is not shown with the block form components appearing in the other figures herein in order to illustrate that such elements are also separable from the networks of such other figures. When so separated, the remaining networks form structures lending themselves to manufacture as integrated circuit products or modular components having a desired integrated capacitor function and useful as a part of larger electronic systems. Examples of such modular products for which the present invention is admirably suited are explained and illustrated at page 57 of the November, 1965 issue of the Scientific American Magazine, published by Scientific American, Inc., 415 Madison Avenue, New York.

Since series coupled capacitors add in inverse relation to their capacitive values, a practical limitation in the use of single varactors in series networks as described herein is that the range of selectable capacitances achieved is approxiamtely that obtainable between the single varactor of highest capacitance value in the network and the varactor of smallest capacitive value in the network. However, the present invention permits virtually limitless increase in the possible range of capacitive values of a network by using parallel coupled groups of varactors at desired stages in the series network. For example such construction is illustrated in FIG. 6 by the addition of varactors 138, 140, 142 and 144 (shown in broken lines in FIG. 6) in parallel with varactors 110, 112, 116 and 122 respectively. It should be understood that while only two varactors are shown in parallel at any part of the series string in FIG. 6, three or more parallel coupled capacitors may be used in selected positions in the series string to achieve the overall capacitive variations desired.

This invention is not limited to the particular details of construction and operation described, as equivalents will suggest themselves to those skilled in the art.

What is claimed is:

1. In a voltage variable capacitance network, the combination of a plurality of voltage variable capacitor elements coupled to each other in series, each element having a reverse bias voltage variable capacitance characteristic and a forward bias conduction characteristic, means for providing a selectable bias voltage across each of said plurality of series coupled variable capacitor elements, and control means coupled for causing said bias voltage means to apply a preselected pattern of forward and reverse bias to the associated voltage variable capacitor elements to effect a predetermined capacitance value across said series.

2. The combination as in claim 1 wherein the selectable bias voltage caused by said control means across each of the capacitor elements is variable in accordance with a preselected pattern for thereby correspondingly varying the capacitance of each associated voltage variable element under reverse bias voltage.

3. The combination as in claim 1 wherein the selectable bias voltage means across each of the capacitor elements is proportioned with respect to the associated elements to effect a linear output capacitive characteristic with respect to applied voltage over the major portion of the capacitive range of the network.

4. The combination as in claim 1 wherein at least one of said plurality of series coupled voltage variable capacitors has coupled in parallel therewith at least one additional voltage variable capacitor to operate as a parallel grouping of voltage variable capacitors in an overall series network for thereby extending the variable capacitance range of the network.

5. In a voltage variable capacitance network, the combination of a plurality of voltage variable capacitor elements coupled to each other in series, each element having a reverse bias voltage variable capacitance characteristic and a forward bias conduction characteristic, means for providing a selectable bias voltage across each of said plurality of series coupled variable capacitor elements for selectively providing forward and reverse bias to the associated variable capacitor element and including a primary bias voltage means and an offset voltage means, said primary bias voltage means being arranged to selectively vary the reverse bias of one of said voltage variable capacitor elements, and said offset voltage means being arranged to provide forward biasing of the other of said voltage variable elements up to a selected voltage value from the primary bias voltage means for thereby respectively removing and adding the capacitance of such associated element with respect to the overall capacitance of the network.

6. The combination as in claim 5 wherein said selected voltage value lies in the range of said reverse bias of said one voltage variable capacitor element.

7. In a voltage variable capacitance network, the combination of a plurality of voltage variable capacitor elements coupled to each other in series, each element being a diode having a reverse bias voltage variable capacitance characteristic and a forward bias conduction characteristic, means for providing a selectable bias voltage across each of said plurality of series coupled variable capacitor elements for selectively providing forward and reverse bias to the associated voltage variable capacitor element and including a primary bias voltage means and an offset voltage means, two of said plurality of voltage variable capacitor elements coupled back-to-back to said primary bias voltage means, and said offset voltage means being in circuit with said primary bias voltage means and one of said back-to-back elements in manner to provide forward biasing on said one voltage variable capacitor element up to a selected value of reverse bias from said primary bias voltage means on the other of said voltage variable capacitor elements for thereby respectively removing and adding the capacitance of such associated element with respect to the overall capacitance of the network.

8. The combination as in claim 7 wherein additional voltage variable capacitor elements are coupled in series with said one voltage variable capacitor element and in the same electrical orientation as said one voltage variable capacitor, and said offset voltage means includes a forward biasing arrangement for each of said additional voltage variable capacitor elements up to selected voltage values from the primary bias voltage means.

9. The combination as in claim 8 wherein each of said selected voltage values at which the associated one and additional voltage variable capacitors cease to be forward biased is different.

References Cited

UNITED STATES PATENTS

| | | | |
|---|---|---|---|
| 2,182,377 | 12/1939 | Guanella | 334—11 |
| 3,118,116 | 1/1964 | Freedman | 334—11 X |
| 3,188,615 | 6/1965 | Wilcox | 340—174.1 |
| 3,196,368 | 7/1965 | Potter | 332—30 |
| 3,283,239 | 11/1966 | Swartwoot et al. | 323—93 X |
| 3,084,335 | 4/1963 | Kosonocky et al. | 307—320 X |
| 3,110,004 | 11/1963 | Pope | 334—15 |
| 3,346,805 | 10/1967 | Hekimian | 323—74 |

WARREN E. RAY, *Primary Examiner.*

U.S. Cl. X.R.

307—320; 323—93, 128